INVENTORS
RAY J. WHITTINGTON
BORIS F. RESMAN
BY Maurice W. Ryan
ATTORNEY

Oct. 9, 1973    R. J. WHITTINGTON ET AL    3,764,351
SHRINK WRAP SHIRRED CASING PACKAGE

Filed June 21, 1971    2 Sheets-Sheet 2

INVENTORS
RAY J. WHITTINGTON
BY BORIS F. RESMAN
Maurice W. Ryan
ATTORNEY

United States Patent Office 3,764,351
Patented Oct. 9, 1973

3,764,351
SHRINK WRAP SHIRRED CASING PACKAGE
Ray Jewel Whittington, Palos Park, and Boris Frank Resman, Downers Grove, Ill., assignors to Union Carbide Corporation, New York, N.Y.
Filed June 21, 1971, Ser. No. 154,721
Int. Cl. A22c 13/00; B65d 85/08
U.S. Cl. 206—46 F
14 Claims

ABSTRACT OF THE DISCLOSURE

Package comprising a multiplicity of shirred sausage casings in stacked parallel relationship, end panel members abutting the ends of the casings, and a film of resilient shrinkable material shrink fitted to the outermost surfaces of the stacked casings, to the edge portions of the panel members and to a portion less than the whole of the outer surface of the end panel members.

---

Figure 1:
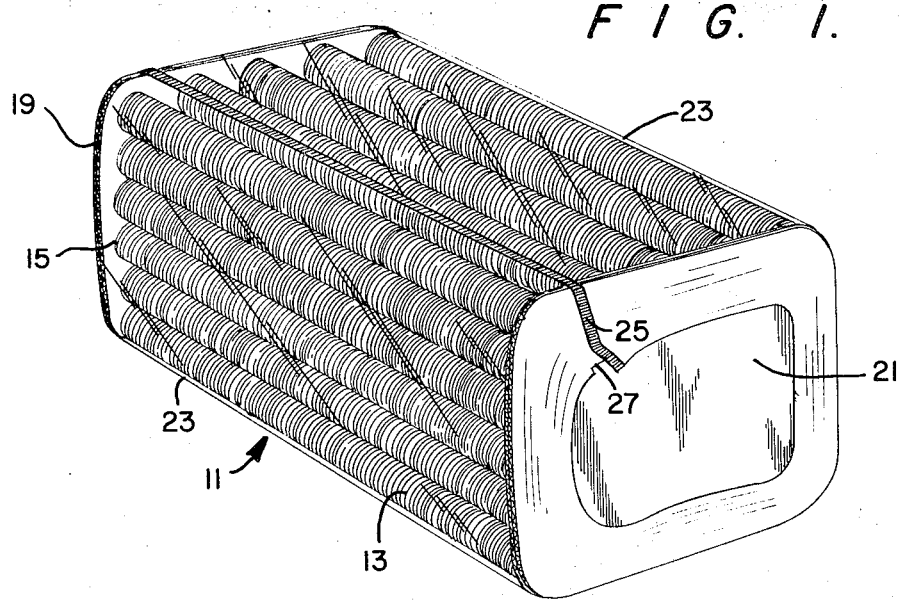

This invention relates to a package article and more particularly to a package of shirred food casings of the type customarily used in the manufacture of meat sausage products such as frankfurters in which an assembly of packaged casings are held securely for handling, shipping and storage by a minimal number of package elements with the entire assembly and other package elements being overwrapped by a resilient shrink fitted film material.

Food casings such as cellulose frankfurter sausage casings are customarily manufactured in continuous tubular lengths which are then shirred and compressed to obtain relatively rigid compressed tubular elements known in the industry as shirred casing sticks. In the sausage manufacturing process the sticks can be successively manually fitted one at a time over a stuffing horn which is used to feed or stuff a meat emulsion into the casing which becomes unshirred and extends longitudinally to the original casing length. When they are utilized with automatic stuffing machinery, it is necessary that the sticks have one closed end to provide a pressure receipt point for an initial deshirring of a portion of the end and insertion into a control annulus prior to feeding of the meat emulsion into the casing. The stuffed casing is twisted or tied off in evenly spaced lengths to define discrete sausage elements, the continuous stuffed lengths are further processed by cooking, smoking, curing and the like steps depending on the requirements of the product being made and the casing is removed and discarded prior to packaging of the final food product.

The shirred casing or stick, comprising as it may a length of up to 50 meters or more of 0.0254 millimeter thick material such as cellulose with a tubular diameter in the order of 15 to 40 millimeters, preferably about 26 millimeters, shirred and compressed to about 50 centimeters or more, is, it will be readily appreciated, a relatively fragile structure. Since the feeding of sticks to the stuffing machines is most frequently an automatic operation involving the positioning of each stick in turn on the stuffing horn from a supply hopper, any structural irregularity in the stick such as curvature of the bore, bowing or other deformation causes breakage, jamming or other malfunction with consequent shutdown and loss of production time on the stuffing machine. It is therefor essential that the structural integrity and shape of the stick as it leaves the shirring machine be carefully maintained through handling, packaging, transportation, storage and unpackaging until the stick is in place on the horn of the stuffing machine.

In addition, preferred practice based on experience in the industry requires that the moisture content of the casings, such as for example cellulose, be maintained at a relatively low level for the shirring operation and at another relatively higher level for the stuffing operation. In a typical operation the cellulose casing is shirred at a moisture content of about 6–10% by weight and stuffed at a moisture content of about 14–20% by weight. When moisture is added to packaged shirred casings or sticks they first elongate and enlarge diametrically and later, as the added moisture equilibrates throughout the packaged sticks, return towards their original size. If the ends are fixed by rigid restraint of the container enclosing them they tend to bow or deform arcuately and become unsuited to automatic feeding onto the horn at the stuffing machine. Furthermore, if a package containing moisturized sticks is designed to accommodate this elongation and enlargement but lacks sufficient residual elasticity to hold the sticks snugly in girth and length on their return towards original size during moisture equilibration, the sticks become loose in the package and will tend to rub abrasively against each other causing pinhole damage in the casing walls which render them useless for stuffing operations.

Numerous efforts have been made over the years to provide packages and packaging techniques to solve the aforedescribed problems attending the packaging, control of humidity, mechanical protection and maintenance of the structural integrity of these sticks but until the time of the present invention, no completely satisfactory solution has been attained.

By way of example of prior efforts in this art, reference may be made to U.S. Pat. No. 3,471,305 to Marbach wherein it is taught to provide vent holes in the end panels of casing containers or "caddies" as they are known in the trade, and further to provide deformable panels of resilient foam or the like material to accommodate the lengthening of the packaged sticks as they expand during absorption of moisture. A typical example of shirring is described in U.S. Pat. No. 2,984,574 to Matecki. Methods of humidifying the shirred casings and otherwise handling them are discussed in U.S. Pat. 3,250,629 to Turbak and in the Marbach patent, supra.

With this then being the state of the art, the present invention was conceived and developed to produce a package uniquely suitable for the packaging of shirred food casings or sticks which embodies all of the important and significant features long sought by the industry and which is easy and economical to assemble, handle, store, transport, open and use without complex or expensive equipment and all with producing a minimum of disposable waste at the use site.

The present invention provides a package of shirred food casings which will maintain the structural integrity of the invidual sticks in the package while allowing them to expand upon moisture absorption and contact with moisture equilibration without bowing, arcing or otherwise deforming or suffering other damage within the package.

The present invention further provides a most efficacious method of packing food casing sticks which solves many if not all of the problems heretofore plauging the industry.

In general, the present invention comprehends a package article comprising, in combination, a multiplicity of shirred food casings disposed in substantially parallel array, each casing having a first end disposed substantially in planar relationship with the first ends of the other arrayed casings and a second end disposed substantially in planar relationship with the second ends of the other arrayed casings, a first end panel member abutting the first ends of said casings, a second end panel member abutting the second ends of said casings and a shrinkable resilient film material surrounding the arrayed casings and the end panel members, said film material being shrink fitted to the outermost surfaces of the arrayed casings, the edge portions of the end panel members and at least a portion of the outer surfaces of the end panel members.

The package article according to the present invention may include a deformable sheet or sheets between the stick ends and the end panel members.

One of the ends of each casing is preferably closed.

The film material overwrap preferably includes a tear strip to facilitate opening the package article.

The film material overwrap is preferably shrink fitted to the package article by means of applied heat.

The completed package article usually has a generally rectangular cross-section.

In some embodiments of package articles according to the present invention one or more additional panel members in addition to the end panels may be included and these may be attached to the end panels independently of the shrink film material overwrap.

Shrink film material for the overwrap may be selected to have greater shrinkability in one direction than in a direction transverse thereto, such as the longitudinal dimension direction with respect to the girth dimension direction or vice versa.

In some instances it is desirable to provide perforations through one or both end panel members to permit humidification of the sticks after packaging.

The invention will now be described with greater particularity and with reference to the drawings wherein FIG. 1 is a perspective view of a package article according to the present invention.

Figure 2:
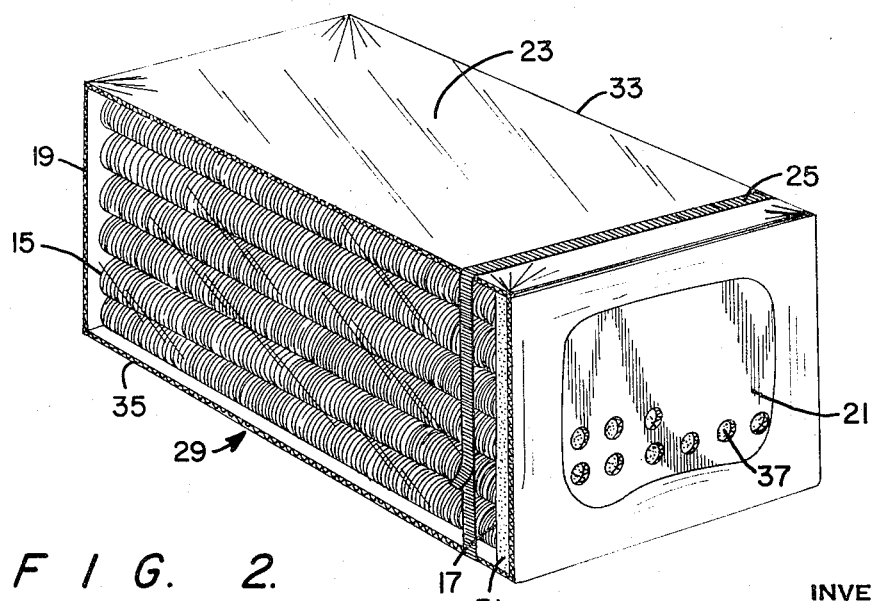
Figure 3:
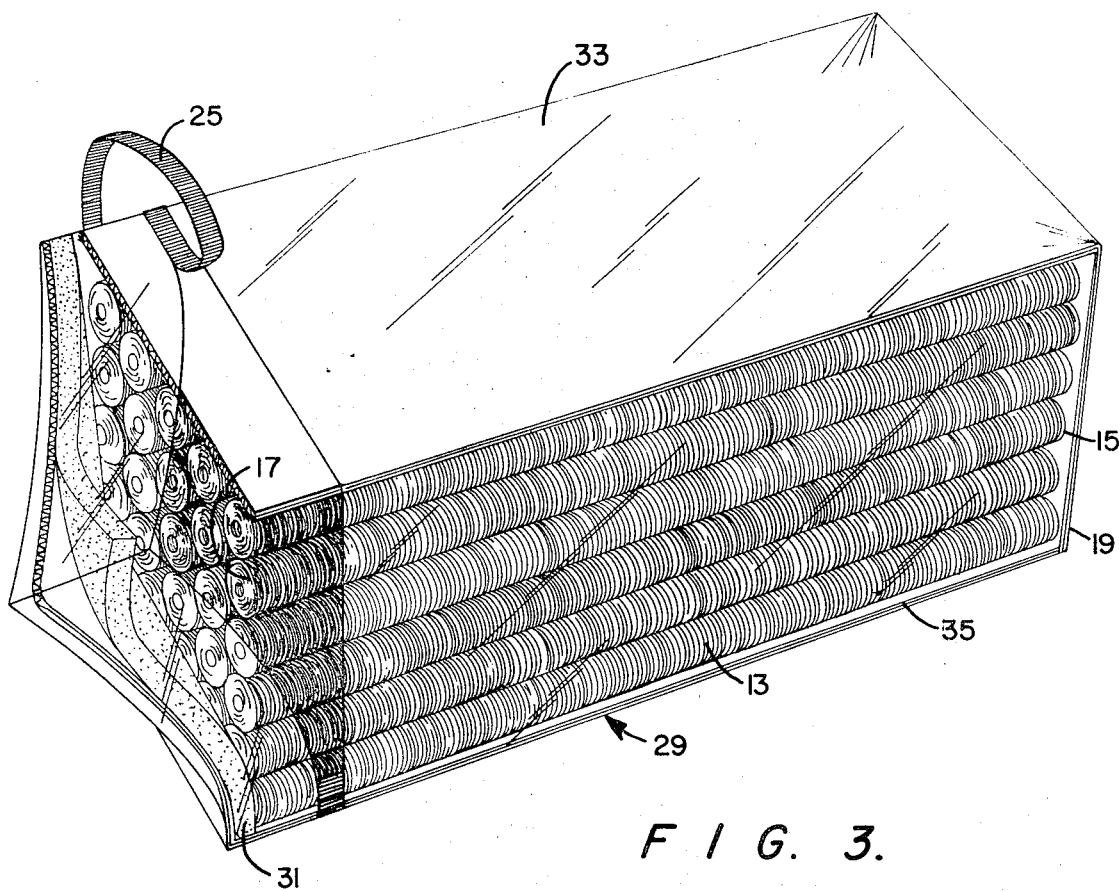

FIG. 2 is a perspective view of an alternative embodiment of a package article according to the present invention and FIG. 3 is a perspective view of the alternative embodiment of FIG. 2 with the package article partly opened to show details of construction.

With reference to the drawings, there is shown in FIG. 1 generally at 11 a completed package article according to the invention comprising a multiplicity of shirred food casings or sticks 13 each having a first end 15 oriented substantially in planar relationship with the first ends 15 of the other sticks 13 and a second end 17 (FIG. 3) oriented substantially in planar relationship with the second ends 17 of the other sticks 13. In the illustrated embodiments sticks 13 are arrayed in a log pile arrangement so as to define a generally rectangular cross section but it is to be understood that other cross sectional configurations are not only possible but in some instances may be desirable and are therefore considered to be within the scope of the present invention. End panel members 19, 21, generally rectangular to conform to the package cross section, abut the respective stick ends 15 and 17. The assembly of the sticks 13 and end panels 19, 21 is overwrapped by an outer covering 23 of shrinkable film material which is shrink fitted to the outermost surfaces of the arrayed casings or sticks 13, the edge portions of the end panel members 19, 21 and at least a portion of the outer surfaces of the end panel members.

It is useful and advantageous to incorporate a tape element tear strip 25 in the outer covering 23 to facilitate opening the package which, in the FIG. 1 embodiment is shown extending longitudinally of the package and in the FIGS. 2, 3 embodiment of the invention is shown extending girthwise around the package. When a longitudinal tear strip 25 is provided, it is a further advantage to incorporate a small slit (or slits) 27 in the outer covering 23 just adjacent the tear strip to facilitate initiation of the tearing action along the tear strip course. When a tear strip 25 is included girthwise in the package, however, a slit or slits near the tear starting point may tend to destroy the integrity of the package outer covering 23 and it is usually sufficient to provide such a tear strip with an outer end extension which can be easily grasped and pulled away from the package to accomplish tearing of the outer covering.

In an alternative embodiment of the invention indicated generally as 29 in FIGS. 2 and 3 there is included a deformable sheet 31 of foam plastic or the like material interposed between the end panel member 21 and the ends 17 of the sticks 13, the purpose of which is to absorb the lengthening action of the sticks as they absorb moisture in the humidification process.

A further alternative which may be desirable in certain instances is the inclusion of one or more panel members 33, 35, in addition to the aforedescribed end panel members 19, 21, interposed longitudinally between the outermost surfaces of the sticks 13 on one or more sides of the package 11 and the inner surface of the shrink wrap outer covering 23. It has also been found advantageous in some instances to have the longitudinally extending panel members connected structurally and independently of the shrink film overwrap to one or both end panel members. This is accomplished by forming an end panel member and a related longitudinally extending panel member of a single sheet of panel material such as corrugated fiberboard or cardboard, scoring and bending the sheet to form a right angle prior to inclusion of the joined panel members in the package article.

Moisture control of the sticks may be effected within the package article of the present invention by the simple expedient of introducing the necessary amount of moisture or water by spraying or otherwise on the individual sticks before they are assembled into a package or into the array of sticks immediately prior to shrinking on the outer covering 23. The necessary amount of moisture is that which will raise the moisture content of the sticks to the extent desired for the stuffing operation. One typical humidification method involves wetting the individual sticks, after they come off the shirring machine and before they are assembled in a package form, on wetted belts designed to provide the desired amount of moisture to each stick. When for fabrication simplicity it may be preferred to not introduce the additional moisture into the package just prior to the sealing time, one or both of the end panel members 19, 21 may be provided with perforations 37 (FIG. 2) in their unwrapped areas and the humidification effected through these perforations by passing the package article through a moisturizing zone or the like prior to unwrapping for use.

The outer covering of shrink film is preferably a plastic material in the order of from 0.05 to 0.08 millimeter thickness which may be employed in either sheet form or in sleeve form.

When the outer covering is employed in the sheet form, the method of making a package article according to the present invention comprises the steps of assembling the number of sticks, which may be humidified, to be packaged, 50 for instance, at a shirring machine station into the preferred pile arrangement by layering them into a U-shaped open top cradle or carrier lined with a sheet of the selected film material. The filled carrier is transported to a sealing station where the film is drawn snugly around the pile of sticks and sealed into a sleeve by heat sealing for instance, an end panel, and, if desired, a deformable sheet is inserted into each open end of the sleeve to abut the stick ends. The outer covering sleeve ends are drawn snugly around the end panels and the entire assembly is transported to a shrinking zone, such as for example a hot air shrink tunnel, where the shrinking is effected.

When the outer covering is employed in sleeve form, the method of making a package article according to the present invention can vary according to the girth dimension of the sleeve selected. If the sleeve girth dimension is less than the girth dimension of the array of sticks to be packaged, the sleeve is stretched on an arrangement of cantilevered rods, the sticks and end panel members are loaded into the stretched sleeve, the stretching force is removed permitting the sleeve to return towards its original girth dimension snugly gripping the assembly, the sleeve ends are folded in over the outer surfaces of the end panels and the package article transported to a shrinking zone for completion. A slight variation on this technique involves a stretching apparatus having four cantilevered rods each adapted to mount a stick longitudinally through its bore and to stretch a sleeve fitted over these mounted sticks sufficiently to permit loading of the remaining sticks and the end panel members. When the sleeve stretching force is relaxed, the snugly bound assembly is slipped off the cantilevered rods with the four sticks which had been mounted on the rods becoming the corner sticks in rectangular cross section of the package article.

If the sleeve girth dimension is greater than the girth dimension of the array of sticks to be packaged, the sleeve need not be stretched but simply loosely fitted over the girth of the array of sticks or held open on any suitable support means while the sticks and any longitudinal or other panel members which may be included are loaded into it. End panel members are added, the sleeve ends folded over and the assembly moved to a shrinking station to complete the package article.

In any of the aforedescribed techniques, a deformable sheet 31 may be included in one or both ends of the package article to abut the stick ends prior to insertion of the end panel members 19, 21. Similarly, longitudinal panel members 33, 35, attached or unattached to the end panel members, may be readily included in accordance with these techniques. In all cases the film material used may preferably include a tear strip as hereinabove described, it being a further advantage in the case of sheet form outer covering to incorporate the tear strip in the seam formed when the sheet longitudinal edges are sealed to form a sleeve.

The resilient character of the plastic film outer covering 23 makes it possible not only to provide for longitudinal expansion and contraction of the casing sticks during moisture absorption and equilibration without having them distort but also to effect a firm girthwise gripping action on the assembled sticks as they enlarge and relax diametrically, binding them structurally into an integral unit having greater strength and resistance to deformation than would otherwise be possible. In addition, a firm girthwise gripping action on the assembled sticks prevents longitudinal movements of the sticks with respect to each other or stick to stick abrasive rubbing action which causes pinholes in the casing walls and consequent malfunctioning in the stuffing operation. Thus the choice of shrinkable resilient or elastic plastic film as the outer covering 23 has a three-fold advantage. When a plastic film outer covering material is selected having a proper balance between shrinkability and elasticity in the longitudinal dimension and the shrinkability effecting girthwise gripping action on the arrayed sticks in the girth dimension of the package article, it is not necessary to include deformable sheets 31 or longitudinal panel members 33, 35 but only the end panel members 19, 21, since the packaged sticks will be permitted to expand longitudinally due to the resiliency or elasticity of the cover material in the one direction while being securely held against bowing or other lateral deformation by the shrinking hold of the cover material in the other. The aforedescribed proper balance will be a matter of choice depending upon many things such as the number of sticks in the package, stick length and diameter, casing wall thickness, humidification requirements and other factors. It may be more advantageous in a given situation to have greater shrinkability of the overwrap in the longitudinal aspect than in the girth aspect of the package while in another the converse may be true.

EXAMPLES

Sample package articles according to the present invention were prepared in accordance with the following procedures.

(I) Synthetic cellulose food casing with a tubular diameter in the order of 26 millimeters and a wall thickness in the order of 0.0254 millimeters was shirred and compressed into 35 centimeter stick lengths from unshirred lengths of approximately 26 meters. These sticks were belt humidified at the shirring machine station and in groups of 50 layered log pile fashion, six in one row and five in the next, into a U shaped carrier lined with a 48 centimeter by 71 centimeter sheet of 0.05 millimeter nominal thick polyethylene film having a longitudinally extending tear strip in the 48 centimeter direction which was the longitudinal direction of the package. Two 14.6 centimeter by 19.1 centimeter 125 kilogram test double wall corrugated fiberboard end panels were placed against ends of the assembled sticks with a sheet of 0.635 centimeter thick polyurethane foam laminated to one end panel abutting the open ends of the sticks. The 48 centimeter edges were gathered so that the polyethylene sheet snugly gripped the array of log piled sticks and heat seamed with a conventional bar type heat sealing apparatus. The polyethylene sheet ends thus formed into sleeve configuration were tucked down on the outer surfaces of the end panels and the entire assembly heat shrunk in conventional heat shrink oven means to make a 50 stick package having a length of 39 centimeters, a width of 19.1 centimeters and a height of 14.6 centimeters.

(II) Sticks prepared according to Sample (I) above were loaded endwise in the same configuration described above into a sleeve of 0.05 millimeter nominal thick polyethylene film which was stretched about 12–13% in the girth dimension from an unstretched sleeve having a flat width of 30.5 centimeters and a length of 48 centimeters, having a tear strip therein in the longitudinal or 48 centimeter dimension. End panels as in Sample (I) above were installed in the sleeve ends with a sheet of 0.635 centimeter thick polyurethane foam laminated to one end panel abutting the open ends of the sticks. The stretching force was released and the filled sleeve removed from the stretching jig. The polyethylene sleeve ends were folded over the outer surfaces of the end panels and the entire assembly heat shrunk as in Sample (I) preparation to make a package of the same size and dimensions.

(III) Sticks prepared according to Samples (I) and (II) above were loaded endwise in the same configuration described above into an unstretched sleeve of 0.05 millimeter nominal thick polyethylene film having a flat width of 34.3 centimeters and a length of 48 centimeters, having a tear strip therein in the longitudinal or 48 centimeter dimension. End panels as in Samples (I) and (II) above, including the polyurethane foam sheet, were installed, the polyethylene sleeve ends folded over the outer surfaces of the end panels and the entire assembly heat shrunk as in Samples (I) and (II) preparation to make a package of the same size and dimensions.

Six each of Samples (I), (II) and (III) were packaged respectively in three corrugated fiberboard cartons lined with an unsealed plastic bag liner of the type customarily used to transport conventional casing stick packages or caddies. These three cartons were loaded on a truck, transported 1500 miles, reloaded to another truck and returned to the departure point in a period of about three weeks.

Another six each of Samples (I), (II) and (III) were packaged in the same manner as described above and stored under conventional storage weight loading at the packaging site for a period of about 90 days.

When the cartons and the sample packaged articles according to the present invention were opened for inspection, examination and testing it was found that moisture was 3% or less than the moisture content at the time of heat sealing, an amount conventionally acceptable in stuffing machine usage. There was no bore occlusion, bowing or other discernable deformation in any of the sticks. The sticks were individually expanded in a water pressure test conventionally used to simulate meat emulsion stuffing condition and found to have suffered no pinholes or other effects detrimental to stuffing machine usage.

Thus it can be seen that the present invention is useful, practical, novel and unobvious in the light of what was known prior to its conception, development and reduction to practice and that it provides a significant advance in the art.

The foregoing description and detailed explanation is illustrative only and should not be construed in any limiting sense, particularly since, in the light of this disclosure, numerous alternative embodiments within the scope of this invention will undoubtedly occur to persons familiar with the art.

What is claimed is:

1. A package article comprising, in combination,
    (a) a multiplicity of shirred food casings disposed in substantially parallel array, each casing having a first end disposed substantially in planar relationship with the first ends of the other arrayed casings and a second end disposed substantially in planar relationship with the second ends of the other arrayed casings,
    (b) a first end panel member abutting the first ends of said casings,
    (c) a second end panel member abutting the second ends of said casings and
    (d) a shrinkable resilient film material surrounding the arrayed casings and the end panel members, said film material being shrink fitted to the outermost surfaces of the arrayed casings, the edge portions of the end panel members and a portion less than the whole of the outer surface of each of the end panel members.

2. A package article according to claim 1 wherein a deformable sheet is included between said first end panel member and the first ends of the arrayed casings.

3. A package article according to claim 2 wherein the first ends of the arrayed casings are closed ends.

4. A package article according to claim 2 wherein the first ends of the arrayed casings are open ends.

5. A package article according to claim 2 wherein a deformable sheet is included between said second end panel member and the second ends of the arrayed casings.

6. A package article according to claim 1 wherein the shrink fitted film material is provided with a tear strip whereby opening of the package article is facilitated.

7. A package article according to claim 1 wherein said shrink fitted film material is shrink fitted by means of applied heat.

8. A package article according to claim 1 wherein the completed article has a generally rectangular cross section.

9. A package article according to claim 1 wherein at least one additional panel member is interposed between at least a portion of the outermost surfaces of the arrayed casings and at least a portion of the inner surface of the shrink fitted film material.

10. A package article according to claim 9 wherein said additional panel member is connected structurally and independently of the shrink film material with at least one of the end panel members.

11. A package article according to claim 1 wherein perforations are provided extending through at least one end panel member in an area of said panel member which is uncovered by said film material.

12. A package article according to claim 1 wherein said shrinkable resilient film material is a plastic material having greater shrinkability in a first planar direction than in a second planar direction transverse to the first planar the package article than in its girth orientation to the package article for the same applied shrinking action.

13. A package article according to claim 1 wherein said shrinkable resilient film material is a plastic material having greater shrinkability in its girth orientation to the package article than in its longitudinal orientation to the package article for the same applied shrinking action.

14. A package article according to claim 1 wherein said shrinkable resilient film material is a plastic material having greater shrinkability in its longitudinal orientation to the package article than its girth orientation to the package article for the same applied shrinking action.

References Cited
UNITED STATES PATENTS

| | | | |
|---|---|---|---|
| 2,967,383 | 1/1961 | Rumsey | 99—174 |
| 3,528,825 | 9/1970 | Doughty | 99—176 |
| 3,206,020 | 9/1965 | Billingsley et al. | 206—65 S |
| 3,471,305 | 10/1969 | Marbach | 99—176 |
| 3,092,246 | 6/1963 | Harrison et al. | 99—171 L P |
| 3,627,116 | 12/1971 | Cooper | 206—65 S |
| 3,171,749 | 3/1965 | Dreyfus et al. | 99—171 R |
| 3,250,629 | 5/1966 | Turbak | 99—176 |
| 3,342,322 | 9/1967 | Weisner et al. | 99—175 |

MORRIS O. WOLK, Primary Examiner

S. B. DAVIS, Assistant Examiner

U.S. Cl. X.R.

99—171 L P, 171 O M, 175; 206—46 F, 65 S; 229—51 T S